(12) United States Patent
Suzuki

(10) Patent No.: US 6,928,973 B2
(45) Date of Patent: Aug. 16, 2005

(54) INTERNAL COMBUSTION ENGINE WITH COMBUSTION HEATER

(75) Inventor: Makoto Suzuki, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 16 days.

(21) Appl. No.: 10/333,478

(22) PCT Filed: Jul. 18, 2001

(86) PCT No.: PCT/JP01/06248

§ 371 (c)(1),
(2), (4) Date: Jan. 21, 2003

(87) PCT Pub. No.: WO02/06646

PCT Pub. Date: Jan. 24, 2002

(65) Prior Publication Data

US 2003/0172891 A1 Sep. 18, 2003

(30) Foreign Application Priority Data

Jul. 19, 2000 (JP) ........................ 2000-219805

(51) Int. Cl.[7] .............................................. F02N 17/02
(52) U.S. Cl. .............................................. 123/142.5 R
(58) Field of Search .................................. 123/142.5 R

(56) References Cited

U.S. PATENT DOCUMENTS 2,617,399 A * 11/1952 Backus ................. 123/142.5 R
6,055,964 A * 5/2000 Suzuki ................. 123/142.5 R
6,106,282 A * 8/2000 Humburg et al. ..... 123/142.5 R

FOREIGN PATENT DOCUMENTS

| EP | 0 916 823 | 5/1999 |
| EP | 0 921 288 | 6/1999 |
| FR | 2 780 097 | 12/1999 |
| JP | 60-078819 | 5/1985 |
| JP | 11-229978 | 8/1999 |
| JP | 11-264366 | 9/1999 |
| JP | 2000-008839 | 1/2000 |
| JP | 2000-186542 | 7/2000 |

* cited by examiner

Primary Examiner—Noah P. Kamen
(74) Attorney, Agent, or Firm—Kenyon & Kenyon

(57) ABSTRACT

The present invention aims at providing a technology capable of increasing a heat quantity of a combustion gas discharged from a combustion heater in an internal combustion engine having the combustion heater. To accomplish this object, the internal combustion engine having the combustion heater comprises a combustion chamber (17d) for combusting a fuel, an engine cooling water circulating between the combustion chamber (17d) and an engine-related element, a heat exchange unit (17a, 17c, 150) for performing a heat exchange between the engine cooling water and a combustion gas produced in the combustion chamber (17d), and heat exchange rate decreasing means (149, 205) for decreasing a heat exchange rate in said heat exchange unit (17a, 17c, 150).

22 Claims, 5 Drawing Sheets

INTERNAL COMBUSTION ENGINE WITH COMBUSTION HEATER

TECHNICAL FIELD

The present invention relates to an internal combustion engine having a combustion heater.

BACKGROUND ARTS

In an internal combustion engine mounted in an automobile etc, particularly in a lean combustion type internal combustion engine that tends to have a small exothermic quantity as in a diesel engine, there is known a technology of providing a combustion heater together for the purpose of enhancing a performance of a heating device for a room and speeding up a warm-up of the internal combustion engine at a cold time.

The combustion heater described above includes, for example, a combustion chamber independent of the internal combustion engine, a water passageway (which will hereinafter be called an [intra-heater cooling water passageway]) formed so as to surround this combustion chamber, an engine cooling water introduction pipe for leading the engine cooling water into the intra-heater cooling water passageway from a water jacket of the internal combustion engine, and an engine cooling water discharge pipe for leading the engine cooling water to the water jacket from the intra-heater cooling water passageway.

In the thus constructed combustion heater, if a temperature of the engine cooling water is low as when the internal combustion engine is in a cold state, the cooling water in the water jacket is led to the intra-heater cooling water passageway, and a part of engine fuel is combusted in a combustion chamber. The engine cooling water led to the intra-heater cooling water passageway receives heat generated when the fuel is burnt in the combustion chamber, thereby raising a temperature of the engine cooling water. The engine cooling water having the thus raised temperature is led to the water jacket from the intra-heater cooling water passageway, and the heat of the engine cooling water is transferred to the internal combustion engine.

As a result, the internal combustion engine can be warmed up at an early stage. Note that when a heater core for heating a car room is disposed on a circulation route of the engine cooling water, the heat of the engine cooling water having the raised temperature in the combustion heater can be also transferred to the air for heating in the heater core. Hence, in the internal combustion engine having the combustion heater, it is possible to speed up the warm-up of the internal combustion engine at the cold time and to enhance the performance of the car room heating device.

On the other hand, the combustion heater performs the combustion by utilizing the fuel of the internal combustion engine as described above, and hence it is desirable that the combustion gas discharged from the combustion heater be purified as in the case of an exhaust gas of the internal combustion engine.

In response to such a request, there is proposed a vehicle heating device including the combustion heater as disclosed in Japanese Patent Application Laying-Open Publication No. 60-78819. The vehicle heating device including the combustion heater disclosed in the above Publication is constructed so that the combustion gas discharged from the combustion heater is led to a portion, disposed more upstream than an exhaust gas purifying device, of an engine exhaust pipe. Accordingly, in the vehicle heating device including the combustion heater, the combustion gas from the combustion heater is purified together with the exhaust gas of the internal combustion engine by the exhaust gas purifying device.

The known exhaust gas purifying device is a catalyst converter carrying a three-way catalyst, an occlusion reduction type lean NOx catalyst or a selective reduction type lean NOx catalyst and so on. In this type of catalyst converter is, however, when a temperature of the catalyst of this catalyst converter is uniformly equal to or higher than a predetermined activation temperature, the catalyst is activated, and harmful gas components contained in the exhaust gas can be purged of. Therefore, the catalyst converter is incapable of sufficiently purging the exhaust gas of the harmful gas components when the catalyst temperature of the catalyst converter is lower than the activation temperature.

By the way, in the lean combustion type internal combustion engine, a quantity of the fuel supplied for the combustion is small, a combustion temperature therefore tends to decrease, and an exhaust temperature tends to decrease corresponding thereto. Especially when the lean combustion type internal combustion engine is in a low-load operation state, the fuel supplied for the combustion becomes be far smaller, and hence the exhaust temperature tends to become by far lower. Accordingly, when the lean combustion type internal combustion engine is in the low-load operation state, there might be a case where the catalyst temperature of the catalyst converter is hard to be kept equal to or higher than the activation temperature only by the exhaust gas of the internal combustion engine.

By contrast, when the lean combustion type internal combustion engine is in a low-load operation area, as in the case of the vehicle heating device including the combustion heater described above, a method is such that the combustion gas discharged from the combustion heater is flowed into the exhaust gas purifying device, and a temperature of the catalyst converter is raised by utilizing the heat of the combustion gas.

In the vehicle heating device including the combustion heater described above, however, the combustion gas discharged from the combustion heater is a gas after undergoing a heat exchange with the engine cooling water and therefore has a less heat quantity.

Further, in the case where the temperature of the engine cooling water is low as when the internal combustion engine is in the cold state, upon an execution of the heat exchange between the combustion gas and the engine cooling water, it follows that a comparatively large quantity of heat is transferred to the engine cooling water from the combustion gas, and there might be a possibility where the temperature of the combustion gas discharged from the combustion heater gets extremely low. Therefore, even when introducing into the exhaust gas purifying device the combustion gas after undergoing the heat exchange with the engine cooling water in the combustion heater, it is difficult to promptly activate the catalyst converter.

SUMMARY THE INVENTION

It is an object of the present invention, which was devised under a variety of circumstances as described above, to provide a technology capable of discharging a combustion gas having a large quantity of heat from a combustion heater in an internal combustion engine having a combustion heater.

To accomplish the above object, an internal combustion engine having a combustion heater, comprises a combustion chamber for combusting a fuel, a heating medium circulating between the combustion chamber and an engine-related element, a heat exchange unit for performing a heat exchange between the heating medium and a combustion gas produced in the combustion chamber, and heat exchange rate decreasing means for decreasing a heat exchange rate in the heat exchange unit.

Herein, the [engine-related element] can be exemplified such as an internal combustion engine body, a heater core of a heating device for a car room, and so on. An engine cooling water can be exemplified as the [heating medium], and further a known vaporization combustion heater can be exemplified as the [combustion heater].

In the thus constructed internal combustion engine having the combustion heater, for example, as in the case where there arises a necessity of raising the temperature of the exhaust gas purifying device provided on the exhaust gas passageway of the internal combustion engine, the heat exchange rate decreasing means decreases the heat exchange rate in the heat exchange unit when there occurs a necessity of discharging the combustion gas holding comparatively much heat from the combustion heater. Namely, when there arises the necessity of discharging the combustion gas holding comparatively a large quantity of heat from the combustion heater, the heat exchange rate decreasing means decreases the quantity of heat transferred to the engine cooling water from the combustion gas.

In this case, it follows that the quantity of heat transferred to the heating medium from the combustion gas in the heat exchange unit decreases, and, as a result, the combustion gas after being heat-exchanged in the heat exchange unit, in other words, the combustion gas discharged from the combustion heater becomes a gas holding a comparatively large quantity of heat.

Thus, in the case where the combustion gas is introduced into the cylinders of the internal combustion engine and into the exhaust gas purifying device and so on, the combustion gas discharged from the combustion heater comes to have the large quantity of heat, and this can contribute to stabilize the combustion in the cylinders and to activate the exhaust gas purifying device at an early stage.

Further, the internal combustion engine having the combustion heater according to the present invention may further comprise a combustion gas discharge passageway for selectively discharging the combustion gas after undergoing a heat exchange in the heat exchange unit to a portion disposed more upstream than an exhaust gas purifying device in an exhaust passageway of the internal combustion engine or to an intake passageway of the internal combustion engine.

Note that the [exhaust gas purifying device] can be exemplified by a catalyst converter, including a case body encasing a three-way catalyst, an occlusion reduction type lean NOx catalyst or a selective reduction type lean NOx catalyst and so on, for purifying the exhaust gas flowing in and out of this case body.

In the thus constructed internal combustion engine having the combustion heater, the combustion gas discharge passageway selectively discharges the combustion gas after being heat-exchanged in the heat exchange unit to the portion, disposed more upstream than the exhaust gas purifying device, of the exhaust passageway or to the intake passageway of the internal combustion engine.

For instance, if there arises a necessity of raising the temperature of the exhaust gas purifying device, the heat exchange rate decreasing means decreases the heat exchange rate in the heat exchange unit, and the combustion gas discharge passageway discharges the combustion gas after being heat-exchanged in the heat exchange unit to the exhaust passageway disposed upstream of the exhaust gas purifying device.

In this case, it follows that the combustion gas holding the comparatively large quantity of heat flows into the exhaust gas purifying device, and therefore the heat of the combustion gas is transferred to the exhaust gas purifying device. As a result, the temperature of the exhaust gas purifying device is raised at the early stage.

On the other hand, if there occurs the necessity of raising the temperature of the suction air of the internal combustion engine and temperatures in the cylinders, the heat exchange rate decreasing means decreases the heat exchange efficiency in the heat exchange unit, and the combustion gas discharge passageway discharges the combustion gas after being heat-exchanged in the heat exchange unit to the intake passageway of the internal combustion engine.

In this case, it follows that the combustion gas holding the comparatively large quantity of heat flows into the intake passageway, and hence the heat of the combustion gas is transferred to the suction air and to an air/fuel mixture. As a result, the temperatures in the cylinders of the internal combustion engine rise, whereby the combustion can be stabilized.

Particularly when the internal combustion engine is in the low-load operation state, the combustion gas holding the comparatively large quantity of heat is supplied to the exhaust gas purifying device from the combustion heater or to the intake passageway of the internal combustion engine, whereby the combustion in the cylinders can be stabilized and the temperature of the exhaust gas purifying device (catalyst) can be raised at the early stage.

Note that the case where there arises the necessity of raising the temperature of the exhaust gas purifying device, can be exemplified such as a case where the catalyst of the exhaust gas purifying device is not yet in the activated state, or a case of having a necessity of obviating sulfur poisoning of the catalyst and so forth.

Moreover, in the internal combustion engine having the combustion heater according to the present invention, the combustion gas discharge passageway may be a passageway forking into branches and thus extending to the exhaust passageway and to the intake passageway from the combustion heater. In this case, it is preferable that combustion gas route switching means for switching over a flow of the combustion gas to the side of the exhaust passageway or to the side of the intake passageway, be provided at the branching point of this combustion gas discharge passageway.

Herein, a three-way switch valve etc formed with outlets and an inlet for the combustion gas in three directions and constructed to switch over the outlets by moving a valve, can be exemplified as the [the combustion gas route switching means].

In a case where the three-way switch valve is used as the combustion gas route switching means, a supply of the combustion gas to the exhaust passageway form the combustion heater and a supply of the combustion gas to the intake passageway from the combustion heater can be surely switched over.

Further, in the internal combustion engine having the combustion heater according to the present invention, the heat exchange unit may include a combustion gas passageway for leading the combustion gas to the outside of the combustion heater, and a heating medium passageway through which the heating medium is sent in and out of the combustion heater formed around the combustion gas passageway, and the heat exchange rate decreasing means may include a through hole formed at one side end of the combustion gas passageway and making an interior and an exterior of the combustion gas passageway communicated with each other, and a fan for forcibly causing an inflow of the air into the combustion gas passageway via this through hole from outside the combustion heater.

In the thus constructed internal combustion engine having the combustion heater, when the fan rotates, the air outside the combustion heater is forcibly introduced into the combustion gas passageway via the through hole. In this case, a quantity of gas in the combustion gas passageway increases, and an interior of the combustion gas passageway comes to a pressurized state. In the following discussion, the air introduced into the combustion gas passageway via the through hole by the fan is referred to as a pressurized air.

As described above, when the pressurized air is introduced into the combustion gas passageway, the heat of the combustion gas is transferred to the pressurized air while the combustion gas and the pressurized air are mixed. Therefore, the combustion gas after the pressurized air has been mixed becomes a combustion gas having a less quantity of heat contained per unit quantity than the combustion gas before the pressurized air is mixed. In other words, the combustion gas after the pressurized air has been mixed becomes a gas exhibiting a lower temperature than the combustion gas before the pressurized air is mixed.

When the temperature of the combustion gas decreases due to the mixing of the pressurized air, a temperature difference between the combustion gas and the heating medium decreases, and the quantity of heat transferred to the heating medium from the combustion gas is reduced. Namely, the heat exchange rate between the combustion gas and the heating medium decreases.

Accordingly, in the thus constructed internal combustion engine having the combustion heater, a total quantity of the combustion gas rises due to the mixing of the pressurized air, and hence, though the quantity of heat contained in the combustion gas per unit quantity is reduced, there decreases the quantity of heat transferred to the heating medium from the combustion gas in the heat exchange unit. Therefore, a total sum of the quantity of heat contained in the whole combustion gas after the heat exchange becomes larger than in a case where the pressurized air is not mixed.

Note that the number of rotations of the fan be, it is preferable, controlled so that the pressurized air can be flowed into the combustion gas passageway in a way that resists a pressure in the combustion gas passageway when the combustion heater operates.

Moreover, in the internal combustion engine having the combustion heater according to the present invention, the fan may be installed at a side end on an upstream side or on a downstream side in a flow direction of the combustion gas within the combustion heater. In short, the fan may be installed in such a portion that the fresh air can be forcibly introduced into the combustion chamber. In this case, the installing portion of the fan can be selected from the upstream-sided end and the downstream-sided end in the flow direction of the combustion gas, and it is therefore possible increase a degree of freedom of designing the combustion heater.

Furthermore, in the internal combustion engine having the combustion heater according to the present invention, the fan may be installed at the side end on the upstream side in the flow direction of the combustion gas within the combustion heater.

In this case, the fan is not exposed to the high-temperature combustion gas and therefore needs no special refractory processing.

Still further, the internal combustion engine having the combustion heater according to the present invention may further comprise a control valve for controlling a quantity of the air flowing through the through hole.

In the thus constructed internal combustion engine having the combustion heater, the pressurized state in the combustion chamber can be changed by changing a degree of aperture of the control valve. Hence, for instance, the quantity of the combustion gas and the heat quantity of the combustion gas can be set to preferable quantities by changing the degree of aperture of the control valve in accordance with the operation state of the internal combustion engine.

BEST MODE FOR CARRYING OUT THE INVENTION

A specific embodiment of an internal combustion engine having a combustion heater according to the present invention will hereinafter be explained with reference to the drawings.

<Basic Configuration of Combustion Heater>

The internal combustion engine having the combustion heater according to the present invention has characteristics in a structure of the combustion heater and in the way of attaching the combustion heater to the internal combustion engine. Hence, the combustion heater is at first explained, and sequentially relationships with the body of the internal combustion engine will be described.

Figure 1:
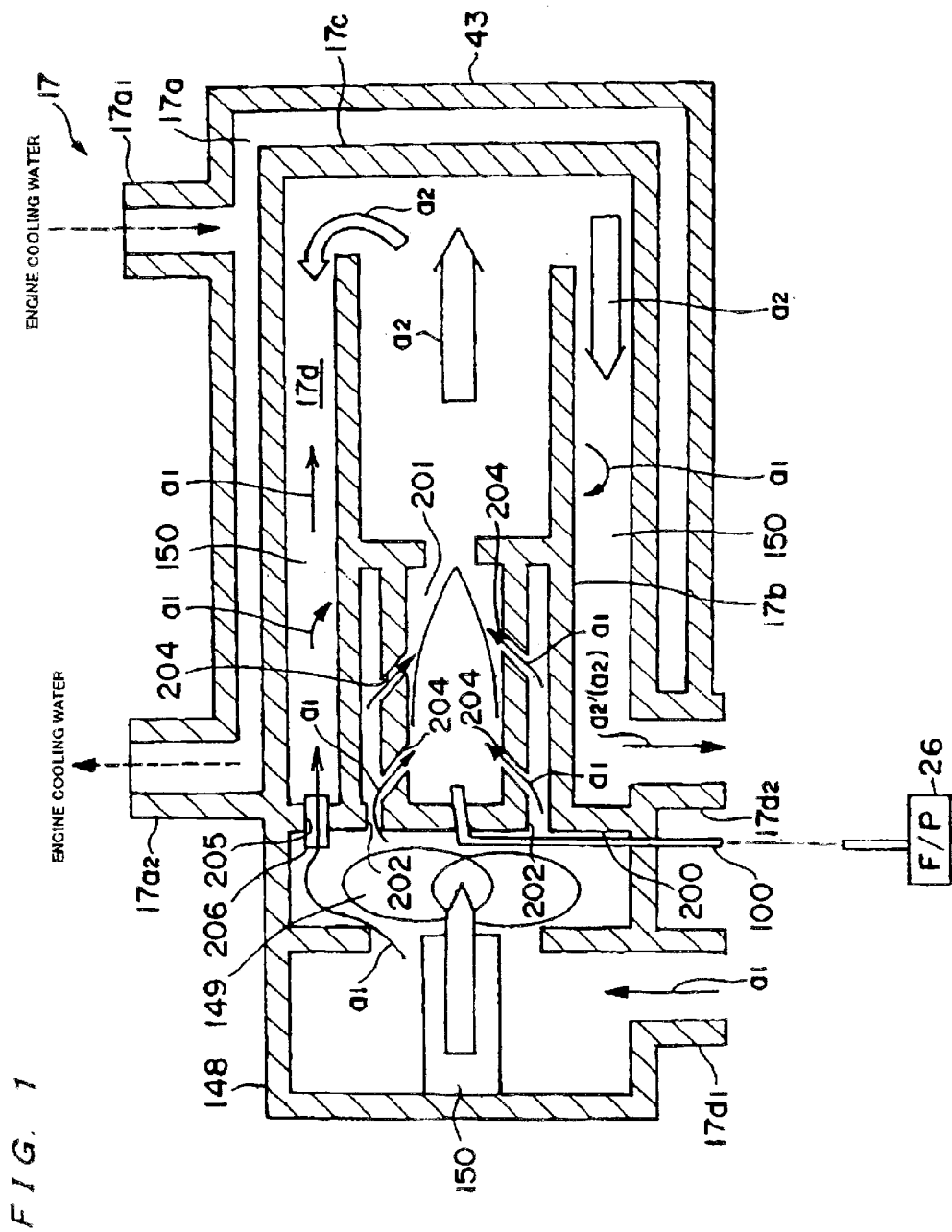
FIG. 1 is a diagram showing an internal configuration of a combustion heater according to the present invention.

A combustion heater 17 is a known vaporizing combustion heater and has in its interior, as shown in FIG. 1, an intra-heater cooling water passageway 17a defined as a heating medium passageway through which an engine cooling water as a heating medium flows from a water jacket (an engine related element) of the internal combustion engine.

The engine cooling water (indicated by an arrowhead of broken line in FIG. 1) flowing through the intra-heater cooling water passageway 17a passes by so as to circulate round a combustion chamber 17d serving as a combustion unit formed inside the combustion heater 17. The engine cooling water receives the heat from the combustion chamber 17d and is warmed for the duration of its passages.

The combustion chamber 17d is constructed of a combustion tube 17b as a combustion source for producing flames and a cylindrical partition wall 17c serving to prevent the flames from leaking outside by covering the combustion tube 17b. The combustion tube 17b is covered with the partition wall 17c, hereby the passageway-like combustion chamber 17d is defined by within the partition wall 17c. Then, this partition wall 17c is likewise covered with an external wall 43 of the combustion heater 17 at an interval. The interval between the partition wall 17c and the external wall 43 is provided, thereby forming the intra-heater cooling water passageway 17a between an inner surface of the external wall 43 and an outer surface of the partition wall 17c.

Further, the combustion heater 17 has an exhaust gas discharge port 17d2 and a fresh air supply port 17d1 from and in which a circulation gas (that is a generic term of a combustion gas a2 and a fresh air a1 flowing out of and into the combustion chamber 17d) circulating inside the combustion heater 17.

A portion in the combustion chamber 17d, through which the circulation gas actually flows, is designated by a numeral 150 called a combustion gas passageway. The combustion gas discharged from the combustion tube 17b via the combustion gas passageway 150, is flows outside the combustion heater 17. The combustion tube 17v is covered with the partition wall 17c, thereby forming the combustion gas passageway 150 around the combustion tube 17b.

The fresh air a1 is, when entering the combustion heater 17 from the fresh air supply port 17d1, supplied for combustion in the combustion chamber 17d, and thereafter the fresh air a1 turns out to be a combustion gas a2 and flows towards the exhaust gas discharge port 17d2.

Further, the external wall 43 is provided with a housing 148 containing an air blowing fan 149 for blowing the fresh air a1 to the combustion tube 17b and a motor 150 for rotationally driving this air blowing fan 149. Then, the housing 148 is provided with the fresh air supply port 17d1, wherein the fresh air a1 entering the housing from the fresh air supply port 17d1 is blown into the combustion tube 17b by the air blowing fan 149.

The combustion tube 17b is secured to the combustion heater 17 by a proper fixing means such as welding a flange 200 provided integrally at one side end of the combustion tube 17b, to an internal wall surface of the partition wall 17c, and so on. Further, the flange 200 is formed with a plurality of introduction holes 202 (only two holes are illustrated in the drawing) for introducing the fresh air a1 into a flame forming chamber 201 of the combustion tube 17b, and a plurality of fresh air through holes 204 are formed in the wall surface formed with the flame forming chamber 201.

Moreover, a portion, closer to the peripheral edge than the introduction hole 202, of the flange 200 is formed with a through hole 205 penetrating this flange 200, thus allowing the combustion gas passageway 150 and an interior of the housing 148 to communicate with each other. This through hole 205 is provided with a opening/closing valve as a control valve for controlling a flow rate of the air pressurized by rotations of the air blowing fan 149. In this case, it follows that the air blowing fan 149 is installed on the side where the through hole 205 is formed in the combustion heater 17.

Note that only one through hole 205 is shown in this embodiment, however, a plurality of through holes 205 may be provided. The fresh air a1 entering the combustion chamber 17d via the through hole 205 is not directly supplied for the combustion and is dedicatedly mixed with the combustion gas a2 and becomes a pressurizing air that increases its flow rate. This increased combustion gas is indicated by a symbol a2'. Note that when the opening/closing valve is closed, the combustion gas becomes the combustion gas a2 that does not increase its flow rate. The combustion gas a2 or a2' flows via the exhaust gas discharge port 17d2 and is discharged outside the combustion heater 17. A selection of whether the combustion gas becomes the combustion gas a2 by closing the opening/closing valve 206 or the combustion gas a2' by opening the same valve 206, will be sequentially explained in an item of [applied examples of the combustion heater 17] which will hereinafter be given.

When the combustion gas a2 or a2' (if these two types of gas are indicated as combustion gases, these combustion gases are generically shown by use of a symbol [A2]. A2 is, however, the symbol used for convenience and is illustrated.) flows through the combustion gas passageway 150, the heat of the combustion gas A2 is transferred to the engine cooling water within the intra-heater cooling water passageway 17a via the partition wall 17c, whereby a temperature of the engine cooling water rises. Accordingly, the combustion gas passageway 150, the partition wall 17c and the intra-heater cooling water passageway 17a correspond to a heat exchange unit according to the present invention.

Note that the heat exchange implies, as known well, a heat migration between a high-temperature fluid and a low-temperature fluid due to a direct or indirect contact between the fluids having different temperatures. The different fluids represent the engine cooling water and the combustion gas in this embodiment. The combustion gas has a higher temperature than that of the engine cooling water, and hence, if the heat exchange is conducted, the heat migrates from the combustion gas side to the engine cooling water side, the temperature of the combustion gas decreases, while the temperature of the engine cooling water rises. Further, an index indicating what rate the heat exchange is performed at, is called a heat exchange rate, and the heat exchange rate becomes higher as a temperature difference between the fluids becomes larger. Moreover, the intra-heater cooling water passageway 17a has a cooling water introduction port 17a1 and a cooling water discharge port 17a2.

Note that the combustion tube 17b includes a fuel supply pipe 100 connected to a fuel pump 26, wherein a fuel for combustion is supplied by a pump pressure of the fuel pump 26. The thus supplied combustion fuel is vaporized within the combustion heater 17 and becomes a vaporized fuel, and this vaporized fuel is ignited by a glow plug (not shown) as an ignition source.

Given next are applied examples in the case of applying the combustion heater 17 described above to the internal combustion engine 1.

APPLIED EXAMPLE 1

An applied example 1 will be explained with reference to FIGS. 1 and 2.

The internal combustion engine 1 is a lean combustion type multicylinder engine such as a diesel engine and so on, wherein an intake manifold 2 is connected to each of the unillustrated cylinders within the engine body 1a thereof. Respective branch pipes of the intake manifold 2 communicate via an unillustrated intake ports with the combustion chambers of the respective cylinders. The intake manifold 2 described above is connected to an intake pipe 3 as an intake passageway, and the intake pipe 3 is connected to an air cleaner containing an air filter.

A compressor housing 5*a* for a turbocharger 5 as a centrifugal supercharger is provided more downstream of the intake pipe 3 than the air cleaner 4. A compressor wheel 5*a*1 is rotatably supported within the compressor housing 5*a*. A rotary shaft of this compressor wheel is integrally connected to a rotary shaft of a turbine wheel 5*b*1 rotatably supported within a turbine housing that will be explained later on, thus forming a shaft member 5*c*. Hence, the compressor wheel and the turbine wheel integrally rotate about the shaft member 5*c*.

Subsequently, an inter cooler 6 for cooling a suction air having a high temperature when compressed in the compressor housing 5*a*, is provided more downstream of the intake pipe 3 than the compressor housing 5*a*.

Moreover, a throttle valve 7 for controlling an suction air flow rate within the intake pipe 3 is installed more downstream of the intake pipe 3 than the inter cooler 6. The throttle valve 7 is fitted with an unillustrated actuator for driving to open and close the throttle vale 7.

In the thus constructed intake system of the internal combustion engine, the fresh air flowing into the air cleaner 4 is, after being purged of its dusts by the air filter, guided to the compressor housing 5*a* via the intake pipe 3 and then compressed within the compressor housing 5*a*.

The fresh air having the high temperature when compressed within the compressor housing 5*a* is cooled by the inter cooler 6 and is, after a flow rate of this suction air has been controlled by the throttle valve 7 as the necessity arises, distributed to the combustion chambers of the respective cylinders through the intake manifold 2. This fresh air is supplied as air for the combustion of the fuel injected from an unillustrated fuel injection valve.

Further, an exhaust manifold 9 is connected to the internal combustion engine 1, and respective branch pipes of the exhaust manifold 9 communicate via unillustrated discharge ports with the combustion chambers of the respective cylinders. The exhaust manifold 9 is connected to an exhaust pipe 10 as an exhaust passageway, and an unillustrated muffler is attached downstream of the exhaust pipe 10. Then, a catalyst converter 11 as an exhaust gas purifying device having an case body encasing an exhaust gas purifying catalyst for purifying the exhaust gas, is installed more upstream of the exhaust pipe 10 than the muffler. An exhaust gas purifying catalyst may be exemplified such as a selective reduction type lean NOx catalyst, an occlusion reduction type lean NOx catalyst or a three-way catalyst.

The turbine housing 5*b* operated by a pressure of the exhaust gas is disposed more upstream of the exhaust pipe 10 than the catalyst converter 11 described above. The intake manifold 2 and the exhaust manifold 9 are connected by an EGR (Exhaust Gas Recirculation) pipe 12 for recirculating a part of the exhaust gas flowing within the exhaust pipe 10 down to the intake manifold 2 from the exhaust manifold 9. The EGR pipe 12 has an EGR valve 13 as a valve for controlling a recirculated exhaust gas quantity.

In the thus constructed exhaust system of the internal combustion engine, an air/fuel mixture burnt in the combustion chamber of each cylinder is led to the exhaust pipe 10 via each of the branch pipes of the exhaust manifold 9, and subsequently flows into the turbine housing 5*b*. The exhaust gas flowing into the turbine housing 5*b* is discharged from the turbine housing 5*b* in a way that rotates the turbine wheel 5*b*1 and thereafter flows to the catalyst converter 11. On this occasion, if a catalyst temperature of the catalyst converter 11 is equal to or higher than an activation temperature, the catalyst of the catalyst converter 11 purifies the exhaust gas.

Further, when the EGR valve 13 is opened, some of the exhaust gas flowing through the exhaust pipe 10 is led to the intake pipe 3 via the EGR pipe 12 and further led to the combustion chamber of the internal combustion engine 1 while being mixed with the fresh air a1 flowing from upstream of the intake pipe 3, and the mixed gas is further mixed with the fuel injected from the unillustrated fuel injection valve and again supplied for the engine combustion.

Next, the internal combustion engine 1 includes the above-described combustion heater 17.

The connection of the combustion heater 17 to the internal combustion engine 1 is established more downstream of the intake pipe 3 than the intake cooler 6 through a fresh air introduction pipe 15 and a combustion gas discharge pipe 18.

The fresh air introduction pipe 15 is a passageway that connects the fresh air supply port 17*d*1 of the combustion heater 17 to the intake pipe 3, and a connecting portion, to the fresh air introduction pipe 15, of the intake pipe 3 is positioned more upstream than the throttle valve 7 and in the vicinity of this valve 7.

Further, combustion gas discharge pipe 18 is a passageway forking into branches and thus extending to the intake pipe 3 and to the exhaust pipe 10 from the exhaust gas discharge port 17*d*2 of the combustion heater 17. Provided at the fork-branching points is a three-way switch valve 40 formed with an inlet and outlets of the combustion gas in three directions and serving as a combustion gas route switching means for switching the outlets for the combustion gas by moving the valve so that a flow route of the combustion gas coming in is switched over to the exhaust pipe 10 or the intake pipe 3.

An intake-sided discharge pipe 50, connected to the intake pipe 3 via the three-way switch valve 40, of the combustion gas discharge pipe 18 is connected to the intake pipe 3 at a portion, positioned more downstream than the installing portion of the throttle valve 7 and in the vicinity of this valve 7, of the intake pipe 3. Further, an exhaust-sided discharge pipe 52, connected to the exhaust pipe 10 via the three-way switch valve 40, of the combustion gas discharge pipe 18 is connected to the exhaust pipe 10 at a portion, between the installing portion of the catalyst converter 11 and the turbine housing 5*b*, of the exhaust pipe 10.

Then, the thee-way switch valve 40 selectively closes any one of the intake-sided discharge pipe 50 and the exhaust-sided discharge pipe 52, thereby switching over a conduction (or shut-off) of the combustion gas discharge to the intake pipe 3 and a conduction (or shut-off) of the combustion gas discharge pipe 18 to the exhaust pipe 10. In other words, the combustion gas is selectively discharged towards a more upstream portion, than the installing portion of the catalyst converter 11, of the exhaust pipe 10 or towards the intake pipe 3. With this contrivance, the combustion gas can be surely flowed towards the intake pipe 3 or the exhaust pipe 10.

Further, the fresh air introduction pipe 15 and the combustion gas discharge pipe 18 are connected to each other by a bridge pipe 60 having an excessive pressure difference cancel check valve 54 for avoiding an excessive pressure difference caused between these two pipes. For example, the excessive pressure difference cancel check valve 54 included in the bridge pipe 60, only when a pressure of the fresh air introduction pipe 15, upon an operation of the turbocharger 5, becomes larger than a pressure of the combustion gas discharge pipe 18, operates to prevent the excessive air from being supplied to the combustion heater 17, thereby facilitating the ignition. In other words, when the excessive air flows into the fresh air introduction pipe 15, the excessive pressure difference cancel check valve 54 opens so that the excessive air takes a bypass to the combustion gas discharge pipe 18 without letting the excessive air through the combustion heater 17, thereby preventing a difficulty of the ignition.

The excessive pressure difference cancel check valve 54 automatically closes when the pressure of the fresh air introduction pipe 15 becomes higher than a predetermined pressure, so that the suction air flowing into the fresh air introduction pipe 15 is branched and thus flowed out to the combustion gas discharge pipe 18.

Figure 2:
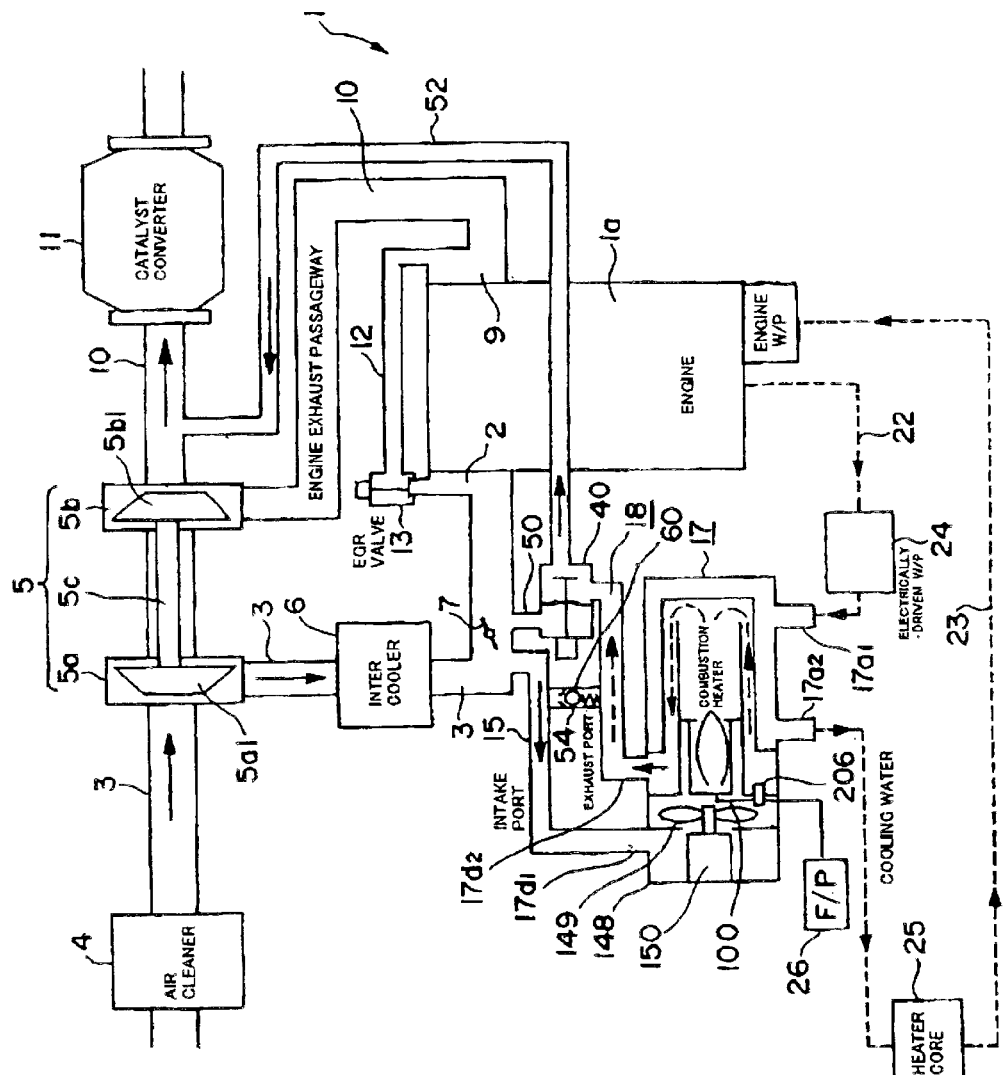
FIG. 2 is a diagram showing an applied example 1 of an internal combustion engine having the combustion heater according to the present invention.

On the other hand, in the combustion heater 17, as shown in FIG. 2, the cooling water introduction port 17$a$1 communicates via the engine cooling water introduction pipe 22 with the unillustrated water jacket of the internal combustion engine 1, and the cooling water discharge port 17$a$2 communicates via the engine cooling water discharge pipe 23 with the water jacket.

An electrically-driven water pump 24 is provided midways of the engine cooling water introduction pipe 22. The water pump 24, even when the internal combustion engine 1 does not operate, can forcibly send the engine cooling water to the intra-heater cooling water passageway 17$a$ from the cooling water introduction port 17$a$1.

A heater core (an engine-related element) 25 of a heating device for a room is disposed midways of the engine cooling water discharge pipe 23, and the heat held by the engine cooling water is transferred to the air for heating during a period for which the engine cooling water warmed by the combustion heater 17 passes through the heater core 25, whereby the room heating device functions.

In the thus constructed internal combustion engine 1, for instance, if there arises a necessity of raising the temperature of the engine cooling water in order to speed up a warm-up of the body of the internal combustion engine or to enhance a performance of the room heating device, the fresh air al is prevented from being supplied into the combustion chamber 17$d$ from the fresh air through holes 204 by closing the opening/closing valve 206 of the combustion heater 17. Then, a quantity of the fresh air a1 supplied into the combustion chamber 17$d$ becomes smaller than in the case of supplying the fresh air a1 into the combustion chamber 17$d$ from the through hole 205 by opening the opening/closing valve 206, and the combustion gas turns out to be the combustion gas a2 and is discharged outside the heater from the exhaust gas discharge port 17$d$2.

The combustion gas a2 is a gas containing no fresh air, which enters the combustion chamber 17$d$ via the through hole 205, and has therefore a temperature higher than the combustion gas a2' containing the fresh air entering the combustion chamber 17$d$ via the through hole 205.

The combustion heater 17, however, includes the intra-heater cooling water passageway 17$a$ and, if the temperature of the engine cooling water is kept constant, a temperature difference between the combustion gas a2 and the engine cooling water is larger than a temperature difference between the combustion gas a2' and the engine cooling water. Hence, a heat exchange conducted between the combustion gas a2 and the engine cooling water has a higher heat exchange rate than a heat exchange conducted between the combustion gas a2' and the engine cooling water. Therefore, the former has a higher temperature of the engine cooling water discharged from the combustion heater 17 than the latter. Hence, in this case, it is preferable that this high-temperature engine cooling water be supplied for speeding up the warm-up f the engine and for enhancing the performance of the room heating device.

A temperature of the engine cooling water coming out of the combustion heater 17 when the combustion gas a2' is emitted, is lower than a temperature of the engine cooling water coming out of the combustion heater 17 when the combustion gas a2 is emitted, however, an emission quantity of the combustion gas a2' becomes larger than the combustion gas a2 to such an extent that the fresh air a1 flows into the combustion chamber 17$d$ via the through hole 205 other than the introduction holes 202.

Further, a quantity of the fresh air a1 changes depending on the number of rotations of the air blowing fan 149. Then, as described above, the heat exchange changes as the quantity of the fresh air al changes, and the quantity of the fresh air a1 changes depending on a size and a shape of the through hole 205 as well as on the number of rotations of the air blowing fan 149. With this contrivance, the heat exchange rage can be decreased, and it can therefore be said that the air blowing fan 149 and the through hole 205 are defined as a heat exchange decreasing means for decreasing the heat exchange rate in the heat exchange unit. Moreover, the air blowing fan 149 rotates, whereby the air as the fresh air coming outside from the combustion heater is forcibly flowed into the combustion chamber 17$d$ via the trough hole 205. Then, the air quantity in the combustion chamber 17$d$ increases, and the interior of the combustion chamber 17$d$ comes into a pressurized state. Hence, this inflow air is called a pressurized air for convenience.

Namely, the temperature of the combustion gas gets lower in a case where the heat exchange rate decreasing means is made to function than in a case where the same means is not made to function, however, the combustion gas quantity increases corresponding to how much the pressured air flows into the combustion gas passageway 150, and a radiation quantity to the engine cooling water decreases corresponding thereto. Therefore, the overall heat quantity held by the combustion gas with its quantity increased might become larger by stopping the functions of the through hole 205 and of the air blowing fan 149 that configure the heat exchange rate decreasing means than an overall heat quantity of the combustion gas in a case where the pressurized air is not introduced into the combustion gas passageway 150. Namely, when the combustion gas a2' flows into the exhaust pipe 10 and the intake pipe 3 via the combustion gas discharge pipe 18 having the three-way switch valve 40, the quantity of heat introduced into the catalyst converter and into the cylinders increases on the whole, therefore the combustion within the cylinders when operated with a low load can be stabilized, and a catalyst temperature of the exhaust gas purifying device can also efficiently be raised.

Further, in a case where the heat exchange rate decreasing means is not made to function, the combustion gas becomes the combustion gas a2 having a high temperature, and the engine cooling water undergoing the heat exchange with this combustion gas a2 flows to the water jacket and to the heater core 25, thereby making it possible to speed up the warm-up of the internal combustion engine body and to enhance the performance of the room heating device.

That is, the engine cooling water having the temperature raised is discharged to the engine cooling water discharge pipe 23 from the cooling water discharge port 17$a$2, and is returned into the water jacket of the engine body 1$a$ through the heater core 25, thus circulating within the water jacket.

In the heater core 25, a part of the heat held by the engine cooling water is transferred to the air for heating, whereby a temperature of the air for heating rises.

As a result, the heat of the engine cooling water flowing within the water jacket of the internal combustion engine 1 is transferred to the components of the internal combustion engine 1, the warm-up performance is improved, and the temperature of the air for heating rises in the heater core 25, whereby the heating performance of the room heating device enhances.

Thus, in the internal combustion engine 1, if there occurs a necessity of increasing the temperature of the catalyst contained in the catalyst converter 11, a decrease in the quantity of heat held by the combustion gas is restrained by use of the heat exchange rate decreasing means, and, even when the heat exchange between the combustion gas and the engine cooling water is executed, the temperature of the combustion gas does not decrease so much.

With this contrivance, the combustion gas comes to have a greater quantity of heat than in a case where no heat exchange rate decreasing means is provided or in a case where the same means is not operated even if provided. Therefore, if the combustion gas having a comparatively large heat quantity is introduced into the cylinders within the internal combustion engine body 1*a* and into the catalyst converter 11, the combustion within the cylinders when operated with the low load can be stabilized, and the catalyst temperature of the catalyst converter 11 can be also efficiently raised. The combustion gas discharge pipe 18 having the three-way switch valve 40 is capable selectively discharging the heat-exchanged combustion gas towards a more upstream portion of the exhaust pipe 10 than the installing portion of the catalyst converter 11 provided in the exhaust pipe 10 or towards the intake pipe 3, and therefore, if a discharge destination of the combustion gas is selected by the three-way switch valve 40 so that the combustion gas flows towards the side, where a desired temperature is not yet reached, of the internal combustion engine body 1*a* or of the catalyst converter (catalyst), the combustion gas can be supplied in concentration on the selected side. Hence, the combustion in the cylinders when operated with the low load can be stabilized, and the catalyst temperature of the catalyst converter 11 can also be raised. Note that the desired temperature is a temperature sufficient for speeding up the warm-up in the case of the internal combustion engine 1 and also a temperature enough for activating the catalyst in the case of the catalyst converter 11.

Then, it is desirable that the number of rotations of the air blowing fan 149 be variable corresponding to a state of the operation of the internal combustion engine 1 so as to feed the pressurized air generated by the operation of the air blowing fan 149 into the combustion gas passageway 150 via the through hole 205, and therefore the temperature of the combustion gas decreases corresponding to this inflow of the pressurized air. Hence, a temperature difference between the combustion gas and the engine cooling water shrinks corresponding to the decrease in the temperature of the combustion gas, so that the heat exchange rate conducted between the combustion gas and the engine cooling water becomes lower than a case where the heat exchange rate decreasing means is not made to function is reduced. As a result, the temperature of the combustion gas gets lower than the case where the heat exchange rate decreasing means is not made to function, and the radiation quantity to the engine cooling water is reduced, however, the combustion gas quantity increases corresponding to how much the pressurized air enters the combustion gas passageway 150.

Therefore, he overall heat quantity held by the combustion gas with its quantity increased can become larger by stopping the functions of the through hole 20 and of the air blowing fan 149 that configure the heat exchange rate decreasing means than the overall heat quantity of the combustion gas in a case where the pressurized air is not introduced into the combustion gas passageway 150.

Namely, the quantity of heat introduced into the catalyst converter 11 and the cylinders increases on the whole, and it is therefore possible to raise the temperature of the exhaust gas purifying device and to stabilize the combustion in the cylinders when operated with the low load.

The air blowing fan 149, when installed on the side, formed with the through hole 205, of the combustion heater 17, is positioned upstream in a flow direction of the circulation gas. In this case, the fan is not exposed in the high-temperature combustion gas and may therefore need neither using a high refractory material nor receiving a special measure against a thermal damage.

Note that the same effect can be obtained also by installing the air blowing fan 149 on the side opposite to the side of the combustion heater 17 formed with the through hole 205. Thus, a degree of freedom of designing the combustion heater 17 can be expanded by obviating the problem in a way that sets either upstream or downstream the installing portion of the air blowing fan 149.

Further, the through hole 205 has the opening/closing valve 206 as the control valve for controlling the flow rate of the air pressurized by the rotations of the air blowing fan 149, and therefore the pressurized state in the combustion chamber 17*d* becomes variable by controlling the opening and closing of the opening/closing valve 206 in accordance with the operation state of the internal combustion engine 1. Then, if a variability of the pressurized state in the combustion chamber 17*d* is preferably controlled corresponding to the operation state of the engine, a combustion gas quantity and a combustion gas temperature that are optimal to the operation state of the engine can be maintained.

APPLIED EXAMPLE 2

Figure 3:
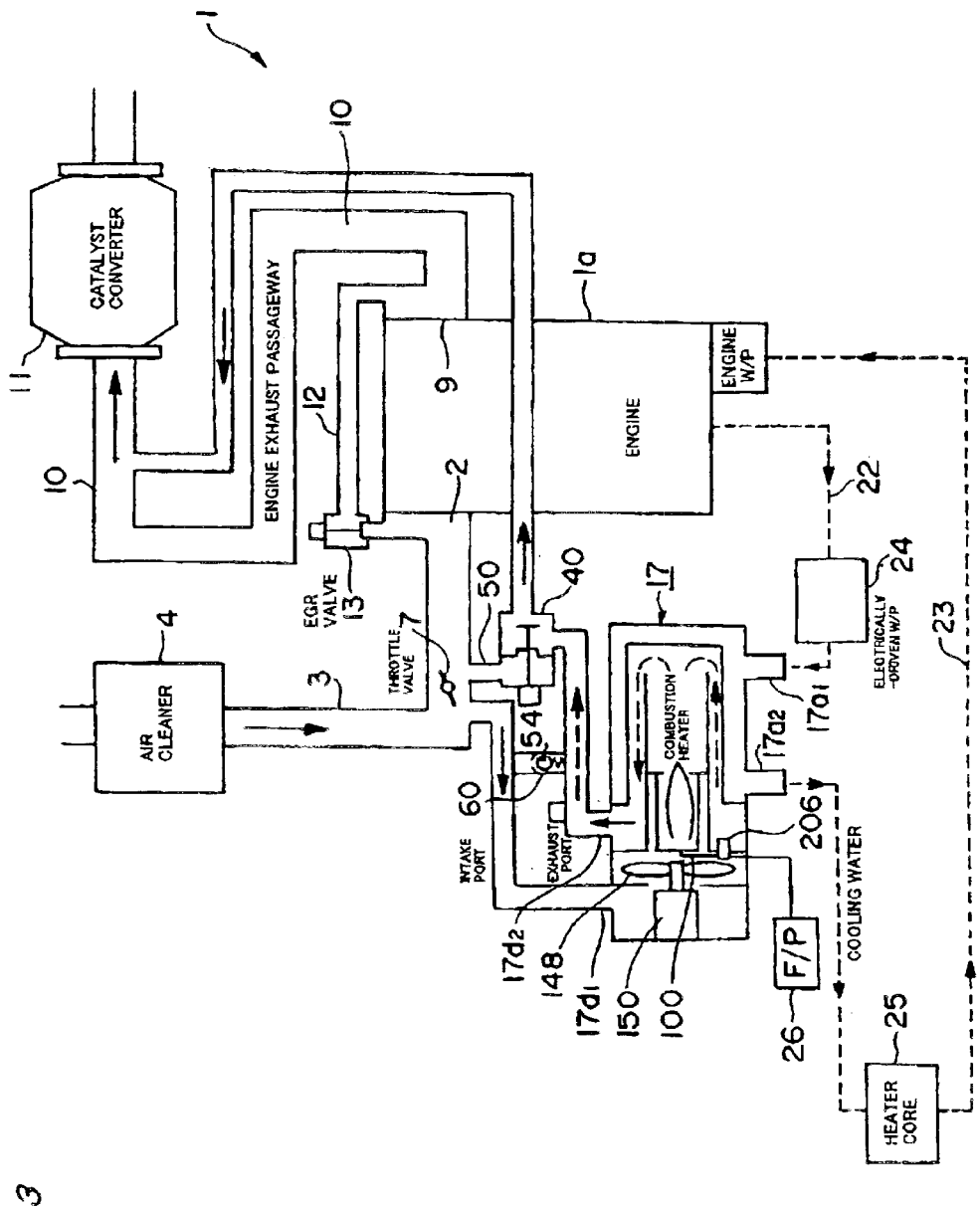
FIG. 3 is a diagram showing an applied example 2 of the internal combustion engine having the combustion heater according to the present invention.

Next, an applied example 2 will be described referring to FIG. 3.

A different point of this applied example 2 from the applied example 1 is a feasibility of being applied to an internal combustion engine including no turbocharger. The same effect as that of the applied example 1 can be acquired in this applied example 2.

APPLIED EXAMPLE 3

Figure 4:
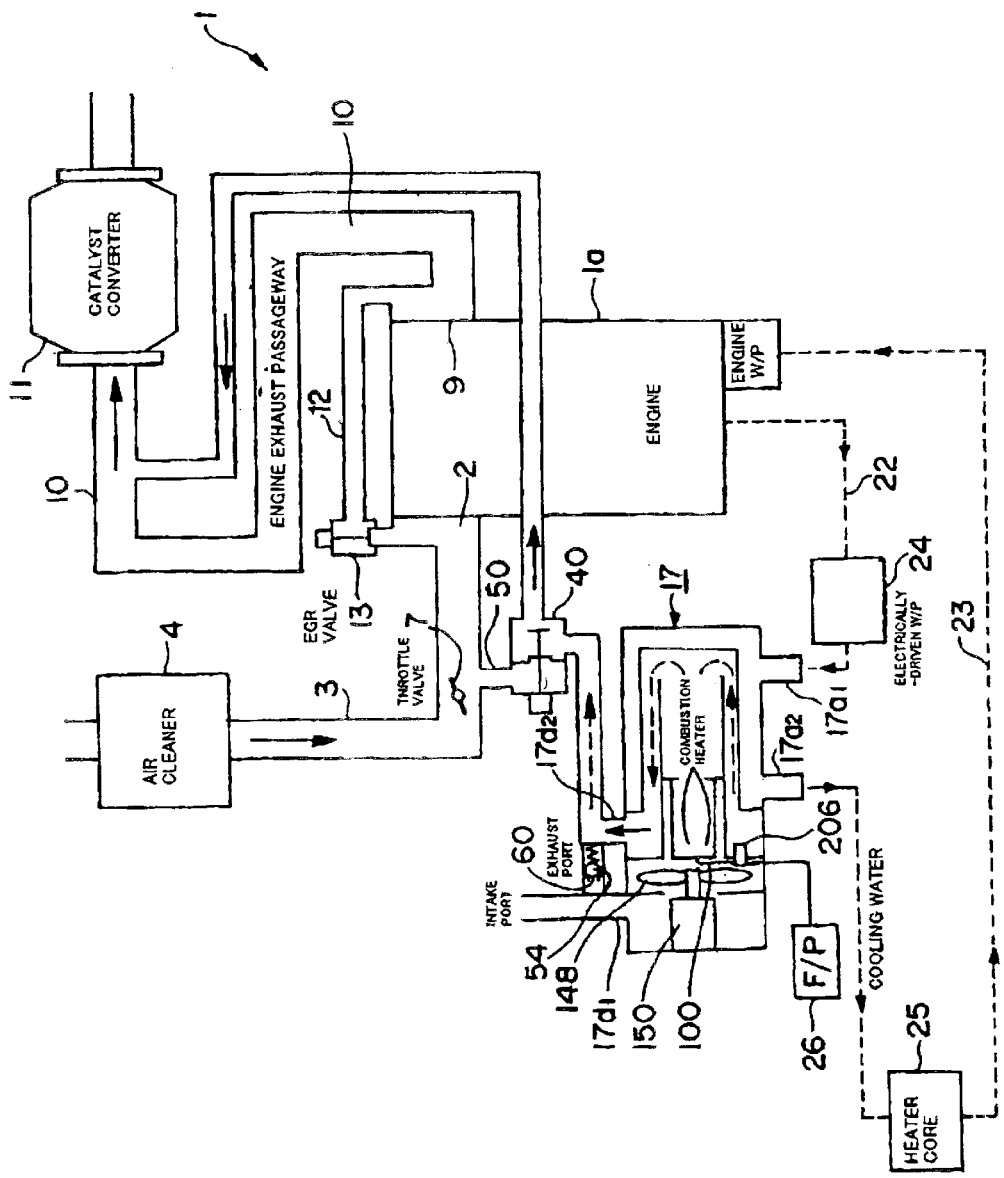
FIG. 4 is a diagram showing an applied example 3 of the internal combustion engine having the combustion heater according to the present invention.

Next, an applied example 3 will be described referring to FIG. 4.

A different point of this applied example 3 from the applied example 2 is that the fresh air introduction pipe 15 opens to the atmospheric air, whereby the suction air is supplied directly from within the atmospheric air. The same effects as those of the applied examples 1 and 2 can be acquired in this applied example 3.

APPLIED EXAMPLE 3

Figure 5:
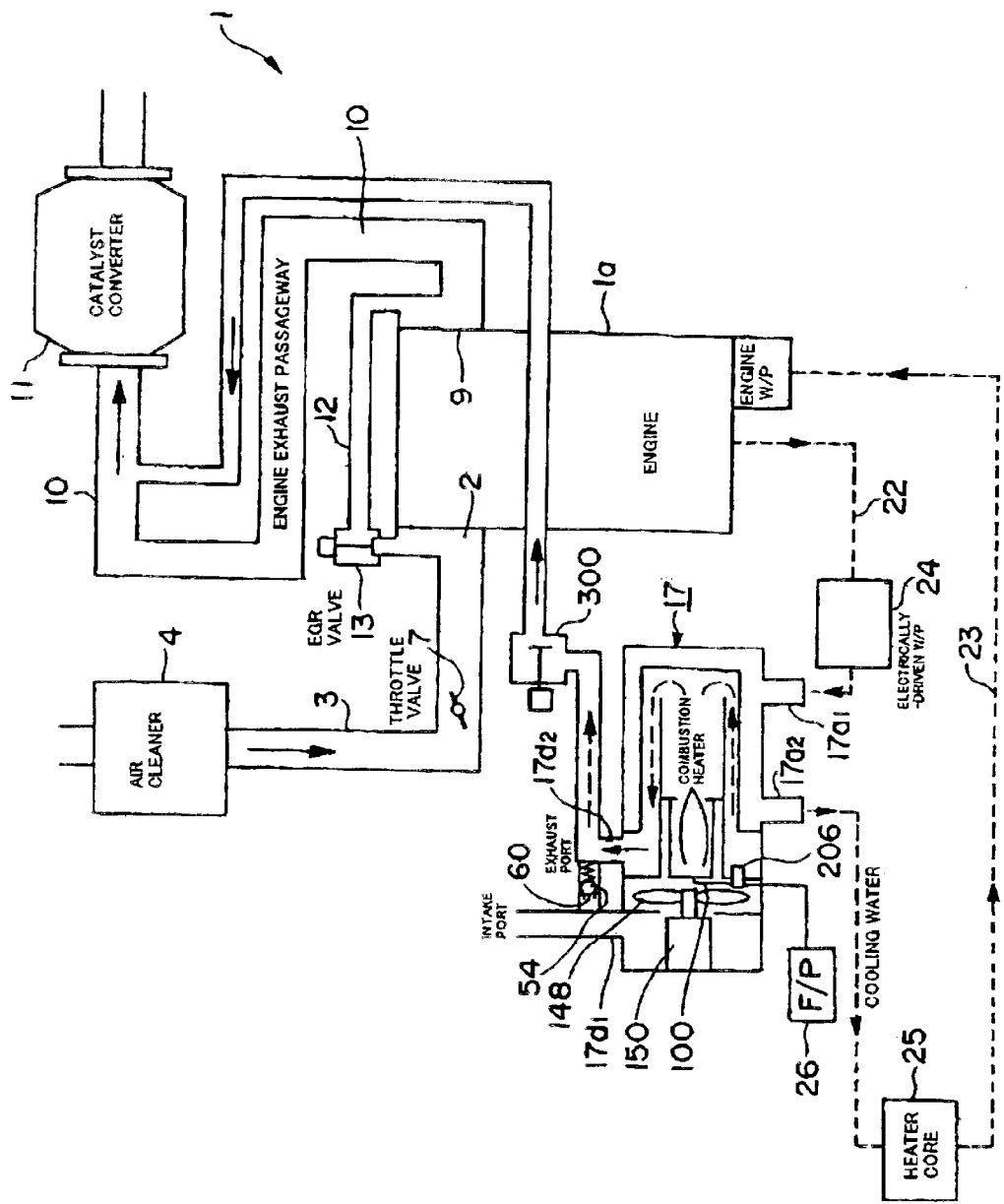
FIG. 5 is a diagram showing an applied example 4 of the internal combustion engine having the combustion heater according to the present invention.

Next, an applied example 4 will be described referring to FIG. 5.

A different point of this applied example 4 from the applied example 3 is that the combustion gas discharge pipe 18 is connected not to the intake pipe 3 but only to the exhaust pipe 10, and that a known opening/closing valve 300 is provided as a substitute for the three-way valve 40.

The intake port of the combustion heater 17 opens to the atmospheric air so that the suction air is supplied directly from within the atmospheric air, however, it does not mean that the structure itself of the combustion heater 17 changes. Accordingly, the same effects as those of the applied examples 1, 2 and 3 can be acquired also in this applied example 4.

What is claimed is:

1. An internal combustion engine having a combustion heater, comprising:
   a combustion chamber for combusting a fuel;
   a heating medium circulating between said combustion chamber and an engine-related element,
   a heat exchange unit for performing a heat exchange between said heating medium and a combustion gas produced in said combustion chamber;
   means for decreasing a heat exchange rate in said heat exchange unit, said means including a through hole formed at one side end of a combustion gas passageway and making an interior and an exterior of the combustion gas passageway communicate with each other, and a fan for forcibly causing an inflow of the air into the combustion gas passageway via this through hole from outside said combustion heater.

2. An internal combustion engine having a combustion heater according to claim 1, further comprising a combustion gas discharge passageway for selectively discharging the combustion gas after undergoing a heat exchange in said heat exchange unit to a portion disposed more upstream than an exhaust gas purifying device in an exhaust passageway of said internal combustion engine or to an intake passageway of said internal combustion engine.

3. An internal combustion engine having a combustion heater according to claim 2, wherein said combustion gas discharge passageway is a passageway forking into branches and thus extending to the exhaust passageway and to the intake passageway from said combustion heater, and
   means for switching over a flow of the combustion gas to the side of the exhaust passageway or to the side of the intake passageway, is provided at the branching point of this combustion gas discharge passageway.

4. An internal combustion engine having a combustion heater according to claim 2, wherein said heat exchange unit includes a combustion gas passageway for leading the combustion gas to the outside of said combustion heater, and a heating medium passageway through which the heating medium is sent in and out of said combustion heater formed around the combustion gas passageway, and
   said heat exchange rate decreasing means includes a through hole formed at one side end of the combustion gas passageway and making an interior and an exterior of the combustion gas passageway communicate with each other, and a fan for forcibly causing an inflow of the air into the combustion gas passageway via this through hole from outside said combustion heater.

5. An internal combustion engine having a combustion heater according to claim 1, wherein said combustion gas passageway leads the combustion gas to the outside of said combustion heater, and further including a heating medium passageway through which the heating medium is sent in and out of said combustion heater formed around the combustion gas passageway.

6. An internal combustion engine having a combustion heater according to claim 5, wherein said fan is installed at a side end on an upstream side or on a downstream side in a flow direction of the combustion gas within said combustion heater.

7. An internal combustion engine having a combustion heater according to claim 5, wherein said fan is installed at the side end on the upstream side in the flow direction of the combustion gas within said combustion heater.

8. An internal combustion engine having a combustion heater, comprising:
   a combustion chamber for combusting a fuel;
   a heating medium circulating between said combustion chamber and an engine-related element,
   a heat exchange unit for performing a heat exchange between said heating medium and a combustion gas produced in said combustion chamber;
   means for decreasing a heat exchange rate in said heat exchange,
   wherein said heat exchange unit includes a combustion gas passageway for leading the combustion gas to the outside of said combustion heater, and a heating medium passageway through which the heating medium is sent in and out of said combustion heater formed around the combustion gas passageway, and
   said heat exchange rate decreasing means includes a through hole formed at one side end of the combustion gas passageway and making an interior and an exterior of the combustion gas passageway communicate with each other, and a fan for forcibly causing an inflow of the air into the combustion gas passageway via this through hole from outside said combustion heater and a control valve for controlling a quantity of the air flowing through the through hole.

9. An internal combustion engine having a combustion heater, comprising:
   a combustion chamber for combusting a fuel;
   a heating medium circulating between said combustion chamber and an engine-related element,
   a heat exchange unit for performing a heat exchange between said heating medium and a combustion gas produced in said combustion chamber;
   means for decreasing a heat exchange rate in said heat exchange,
   wherein said combustion gas discharge passageway is a passageway forking into branches and thus extending to the exhaust passageway and to the intake passageway from said combustion heater,
   means for switching over a flow of the combustion gas to the side of the exhaust passageway or to the side of the intake passageway, is provided at the branching point of this combustion gas discharge passageway
   wherein said heat exchange unit includes a combustion gas passageway for leading the combustion gas to the outside of said combustion heater, and a heating medium passageway through which the heating medium is sent in and out of said combustion heater formed around the combustion gas passageway, and
   said heat exchange rate decreasing means includes a through hole formed at one side end of the combustion gas passageway and making an interior and an exterior of the combustion gas passageway communicate with each other, and a fan for forcibly causing an inflow of the air into the combustion gas passageway via this through hole from outside said combustion heater.

10. A method of operating a combustion heater coupled to internal combustion engine, comprising:
    combusting a fuel in a combustion chamber;
    circulating a heating medium between said combustion chamber and an engine-related element;

performing a heat exchange between said heating medium and a combustion gas produced in said combustion chamber at a predetermined rate by making an interior and an exterior of a combustion gas passageway communicate with each other, through forcibly causing an inflow of the air into a combustion gas passageway via a through hole from outside said combustion heater with a fan.

11. A method according to claim 10, further comprising selectively discharging the combustion gas after undergoing a heat exchange in said heat exchange unit to a portion disposed more upstream than an exhaust gas purifying device in an exhaust passageway of said internal combustion engine or to an intake passageway of said internal combustion engine.

12. A method according to claim 11, wherein said combustion gas is discharged to a discharge passageway forking into branches and thus extending to the exhaust passageway and to the intake passageway from said combustion heater, and further including:

selectively switching over a flow of the combustion gas to the side of the exhaust passageway or to the side of the intake passageway, is provided at the branching point of this combustion gas discharge passageway.

13. A method according to claim 11, wherein said combustion gas passageway leads the combustion gas to the outside of said combustion heater, and a heating medium passageway through which the heating medium is sent in and out of said combustion heater is formed around the combustion gas passageway.

14. A method according to claim 10, wherein said combustion gas passageway leads the combustion gas to the outside of said combustion heater, and a heating medium passageway through which the heating medium is sent in and out of said combustion heater is formed around the combustion gas passageway.

15. A method according to claim 14, and further including controlling a quantity of the air flowing through the through hole.

16. An internal combustion engine having a combustion heater, comprising:

a combustion chamber for combusting a fuel;

a heating medium circulating between said combustion chamber and an engine-related element, a heat exchange unit for performing a heat exchange between said heating medium and a combustion gas produced in said combustion chamber;

a unit that is heated by the combustion gas after performance of heat exchange in said heat exchange unit;

means for decreasing a heat exchange rate in said heat exchange unit, said means including a through hole formed at one side end of a combustion gas passageway and making an interior and an exterior of the combustion gas passageway communicate with each other, and a fan for forcibly causing an inflow of the air into the combustion gas passageway via this through hole from outside said combustion heater.

17. An internal combustion engine having a combustion heater according to claim 16, further comprising a combustion gas discharge passageway for selectively discharging the combustion gas after undergoing a heat exchange in said heat exchange unit to a portion disposed more upstream than an exhaust gas purifying device in an exhaust passageway of said internal combustion engine or to an intake passageway of said internal combustion engine.

18. An internal combustion engine having a combustion heater according to claim 17, wherein said combustion gas discharge passageway is a passageway forking into branches and thus extending to the exhaust passageway and to the intake passageway from said combustion heater, and means for switching over a flow of the combustion gas to the side of the exhaust passageway or to the side of the intake passageway, is provided at the branching point of this combustion gas discharge passageway.

19. An internal combustion engine having a combustion heater according to claim 16, wherein said combustion gas passageway leads the combustion gas to the outside of said combustion heater, and further including a heating medium passageway through which the heating medium is sent in and out of said combustion heater formed around the combustion gas passageway.

20. An internal combustion engine having a combustion heater according to claim 19, wherein said fan is installed at a side end on an upstream side or on a downstream side in a flow direction of the combustion gas within said combustion heater.

21. An internal combustion engine having a combustion heater according to claim 19, wherein said fan is installed at the side end on the upstream side in the flow direction of the combustion gas within said combustion heater.

22. An internal combustion engine having a combustion heater, comprising:

a combustion chamber for combusting a fuel;

a heating medium circulating between said combustion chamber and an engine-related element, a heat exchange unit for performing a heat exchange between said heating medium and a combustion gas produced in said combustion chamber;

a unit that is heated by the combustion gas after performance of heat exchange in said heat exchange unit;

means for decreasing a heat exchange rate in said heat exchange unit, wherein said heat exchange unit includes a combustion gas passageway for leading the combustion gas to the outside of said combustion heater, and a heating medium passageway through which the heating medium is sent in and out of said combustion heater formed around the combustion gas passageway, and said heat exchange rate decreasing means includes a though hole formed at one side end of the combustion gas passageway and making an interior and an exterior of the combustion gas passageway communicate with each other, and a fan for forcibly causing an inflow of the air into the combustion gas passageway via this through hole from outside said combustion heater, and a control valve for controlling a quantity of the air flowing though the though hole.

* * * * *